US008168279B2

(12) United States Patent
Schalk et al.

(10) Patent No.: US 8,168,279 B2
(45) Date of Patent: May 1, 2012

(54) SYSTEM AND METHOD FOR FORMING LABELS

(75) Inventors: Wesley R. Schalk, Camas, WA (US); M. Lynn Cheney, Vancouver, WA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 1967 days.

(21) Appl. No.: 11/239,727

(22) Filed: Sep. 29, 2005

(65) Prior Publication Data
US 2007/0071931 A1  Mar. 29, 2007

(51) Int. Cl.
*B32B 9/00* (2006.01)
*B32B 33/00* (2006.01)
*B32B 3/02* (2006.01)
*B32B 3/10* (2006.01)
*B32B 3/00* (2006.01)
*B32B 7/14* (2006.01)
*B32B 7/06* (2006.01)
*B41M 5/00* (2006.01)
*B44C 1/17* (2006.01)
*G03G 7/00* (2006.01)

(52) U.S. Cl. ............ 428/40.1; 428/32.1; 428/32.24; 428/66.6; 428/66.7; 428/131; 428/134; 428/195.1; 428/201; 428/202; 428/203

(58) Field of Classification Search ............... 428/32.13, 428/32.17
See application file for complete search history.

(56) References Cited

U.S. PATENT DOCUMENTS

| | | | |
|---|---|---|---|
| 6,168,841 B1 | 1/2001 | Chen | |
| 6,189,590 B1 | 2/2001 | Tsay | |
| 6,463,026 B1 * | 10/2002 | Anderson | 720/719 |
| 6,884,504 B2 | 4/2005 | Liu et al. | |
| 2002/0098327 A1 * | 7/2002 | Ohta et al. | 428/195 |
| 2002/0106476 A1 | 8/2002 | Hirai et al. | |
| 2002/0192465 A1 | 12/2002 | Liu et al. | |
| 2004/0001944 A1 * | 1/2004 | Kuwahata | 428/315.7 |
| 2005/0109454 A1 | 5/2005 | Katoh et al. | |

FOREIGN PATENT DOCUMENTS

| | | |
|---|---|---|
| JP | 2002-278461 A | 9/2002 |
| WO | WO 99/56682 * | 11/1999 |
| WO | WO 03/078173 * | 9/2003 |
| WO | WO 03/078173 A | 9/2003 |

* cited by examiner

*Primary Examiner* — Callie Shosho
*Assistant Examiner* — Frank D Ducheneaux

(57) ABSTRACT

A method of forming a label includes providing a semi-opaque or transparent film, disposing an ink receptive coating on at least one side of the semi-opaque or transparent film, forming an adhesive track on a perimeter of the ink receptive coating, and masking the adhesive track with a release member configured to provide access to the ink receptive coating for image formation.

6 Claims, 12 Drawing Sheets

SYSTEM AND METHOD FOR FORMING LABELS

BACKGROUND

Optical discs have become an industry standard for data storage in the fields of computers, videos, pictures, games, and music, for example. Optical discs include, but are not limited to, compact discs (CDs), digital video (or versatile) discs (DVDs), and game system discs in a variety of formats. Commercially produced optical discs usually have digital data recorded on one side of the disc and a visual display printed on the other side of the disc.

In some instances, optical discs are created that can store data on both sides of the disc. However, in many cases, it is desirable to limit the optical disc data to a single side of the disc, leaving the other side of the disc for printed text, patterns, or graphics. The printed labeling on a non-data side of an optical disc can include a decorative design, text, or both. Additionally, Braille dots may be embossed on the printed labeling to allow the content of the label to be read by a blind or visually limited individual.

As optical technology has advanced, writeable and rewriteable optical discs and equipment for writing onto the discs have become reasonably priced within the grasp of ordinary consumers. Thus, many consumers currently have the ability to store data on an optical disc using home office equipment. However, specialized and expensive equipment is required to print labeling on an optical disc. Consequently, the labeling of discs by most consumers is typically limited to printing on separate adhesive labels that are adhered to the non-data side of the disc or hand-writing with a marker directly on the disc or an adhesive label.

The optical discs used as storage mediums frequently have two sides: a data side configured to receive and store data and a label side. The label side is traditionally a background on which the user hand writes information to identify the disc.

Label images on digitally readable discs can be printed using water-based inks. Further, production of digitally readable discs is increasingly custom or short run requiring digital printing methods such as thermal or piezoelectric inkjet to economically produce labels. Protecting these digitally readable disc label images against abrasion, water, alcohol, other liquid spills, ink smear, fading, blocking or other image-degradation processes and effects, while securely adhering the labels to the digitally readable discs has become an important consideration. Such protection is particularly desirable for digitally readable disc label images produced with water-based (water-soluble) or other liquid inks, as well as documents printed or imaged with toner.

SUMMARY

A system for forming a label includes a semi-opaque or transparent film, a hydrophilic ink receptive emulsion coated on at least one side of the semi-opaque or transparent film, an adhesive track formed on a periphery of the ink receptive coating, and a masking release member coupled to the adhesive track, wherein the masking release member is configured to provide access to the ink receptive coating for image formation.

Additionally, according to one exemplary embodiment, a method of forming a label includes providing a semi-opaque or transparent film, disposing an ink receptive coating on at least one side of the semi-opaque or transparent film, forming an adhesive track on a perimeter of the ink receptive coating, and masking the adhesive track with a release member configured to provide access to the ink receptive coating for image formation.

BRIEF DESCRIPTION OF THE DRAWINGS

The accompanying drawings illustrate various embodiments of the present system and method and are a part of the specification. The illustrated embodiments are merely examples of the present system and method and do not limit the scope of the disclosure.

Throughout the drawings, identical reference numbers designate similar, but not necessarily identical, elements.

DETAILED DESCRIPTION

The present exemplary systems and methods provide for the formation and use of high quality imageable transparent labels that are both durable and may be securely coupled to a desired substrate. According to one exemplary embodiment, the present exemplary system and method incorporates an ink receiving layer to receive a desired mirror image bordered by a plurality of annular adhesive rings having vents formed therein. In other exemplary embodiments, a single adhesive border surrounds the ink receptive layer. In other embodiments, the adhesive borders are solid to reduce likelihood of moisture penetrating under the label. By forming the plurality of annular adhesive rings on the borders of the ink receiving layer, attachment of the label to a desired substrate is simple and robust, while avoiding trapping air bubbles between the label and the desired substrate. Further, absence of adhesive in the ink receptive layer provides a means to handle the label without contacting adhesive, further increasing the ease of assembly. Further details of the present label forming system, as well as exemplary methods for forming images on the label and applying the label to a desired substrate will be described in further detail below.

As used in the present specification, and in the appended claims, the term "optical disc" is meant to be understood broadly as including, but in no way limited to, audio, video, multi-media, and/or software discs that are machine readable in a CD and/or DVD drive, or the like. Non-limiting examples of optical disc formats include, writeable, recordable, and rewriteable discs such as DVD, DVD-R, DVD-RW, DVD+R, DVD+RW, DVD-RAM, CD, CD-ROM, CD-R, CD-RW, and the like.

For purposes of the present exemplary systems and methods, the term "emulsion" refers to any number of liquid droplets dispersed in another immiscible liquid. The dispersed phase droplet sizes may range from approximately 0.1-10 µm.

In the following description, for purposes of explanation, numerous specific details are set forth in order to provide a thorough understanding of the present systems and methods for forming a high quality transparent label. It will be apparent, however, to one skilled in the art that the present systems and methods may be practiced without these specific details. Reference in the specification to "one embodiment" or "an embodiment" means that a particular feature, structure, or characteristic described in connection with the embodiment is included in at least one embodiment. The appearance of the phrase "in one embodiment" in various places in the specification are not necessarily all referring to the same embodiment.

Exemplary Structure

Figure 1:
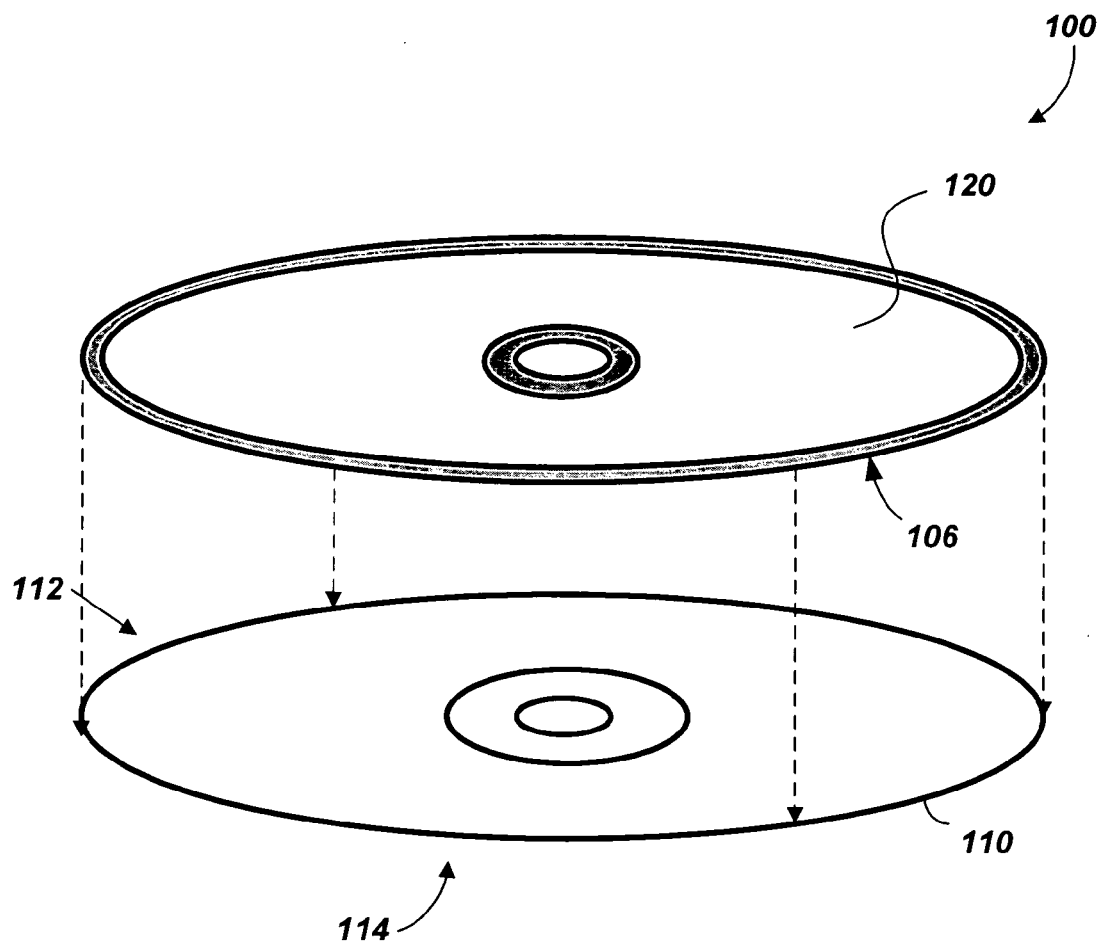
FIG. 1 illustrates an exploded perspective view of the components of an optical disc and a labeling system, according to one exemplary embodiment.

FIG. 1 illustrates a schematic view of an optical disc system (100) including an optical disc (110) and a label system (120). As used herein, for ease of explanation only, the present exemplary system and method for forming a high quality transparent label will be described in the context of forming a label for an optical disc system. However, the present systems and methods may be applied to labels for any number of substrates including, but in no way limited to, labels for electronics, printers, copiers, plaques, control pads, pharmaceutical bottles, and the like.

According to one exemplary embodiment, illustrated in FIG. 1, the optical disc (110) includes a top surface (112) and an opposing bottom surface (114). The bottom surface (114) has a data surface formed thereon configured to store data while the top surface (112) may be free of data and otherwise configured to receive the present exemplary label system (120).

With respect to the bottom surface (114) of the optical disc (110), data may be stored thereon, as is well known in the art. As used herein, the term "data" is meant to be understood broadly as including non-graphic information digitally or otherwise embedded on a radiation image-able disc. According to the present exemplary embodiment, data can include, but is in no way limited to, audio information, video information, photographic information, software information, and the like.

In contrast to the bottom surface (114) of the exemplary optical disc (110), the top surface (112) of the optical disc (110) includes a non-data carrying surface configured to receive the label system (120). According to one exemplary embodiment, the label system (120) includes an adhesive layer (106) configured to couple the label system (120) to the top surface (112) of the optical disc (110). Additionally, according to one exemplary embodiment, the present label system (120) is configured to provide scratch protection to a formed image. Prior to adhesion of the label system (120), the top surface (112) of the optical disc (110), may provide access to the metallic data carrying surface of the disk (110), thereby exposing the data layer to damage from objects such as ball point pens and the like. According to one exemplary embodiment, the present label system (120) provides a layer of protection for the metallic data carrying surface from these forms of damage. Further details of the exemplary label system (120) will be described in detail below with reference to FIGS. 2-4.

Figure 2:
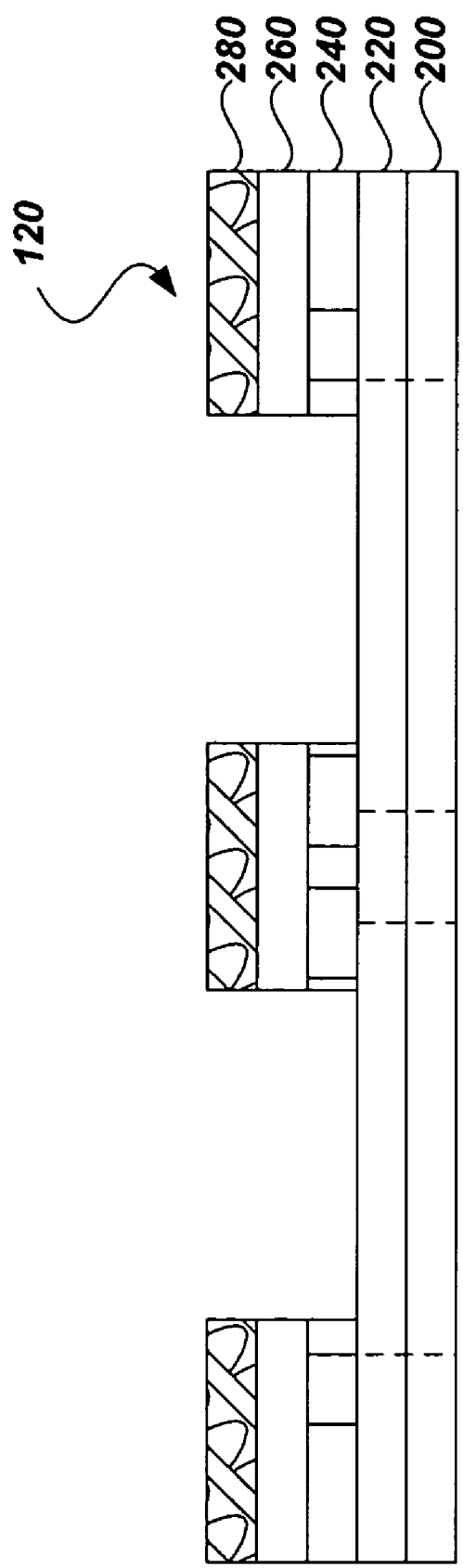
FIG. 2 is a cross-sectional side view of a substrate labeling system, according to various exemplary embodiments.

According to one exemplary embodiment illustrated in FIG. 2, the present label system (120) includes a film (200) having a printable emulsion (220) coupled to at least one surface of the film (200) to form an inkjet printable label. Additionally, an adhesive (240) is formed on an opposing side of the printable emulsion (220), followed by a release layer (260), and a top ink receptive coating (280). According to the present exemplary system, the adhesive (240) and the ink receptive printable emulsion (220) are separated so that the individual properties of each of the areas are optimized for their respective functions; the ink receptive printable emulsion is designed to maximize image quality and longevity while the adhesive area is designed to maximize the bond between the label and the top of an optical disc. Further details of each of the label system (120) forming layers will be described below.

Figure 3:
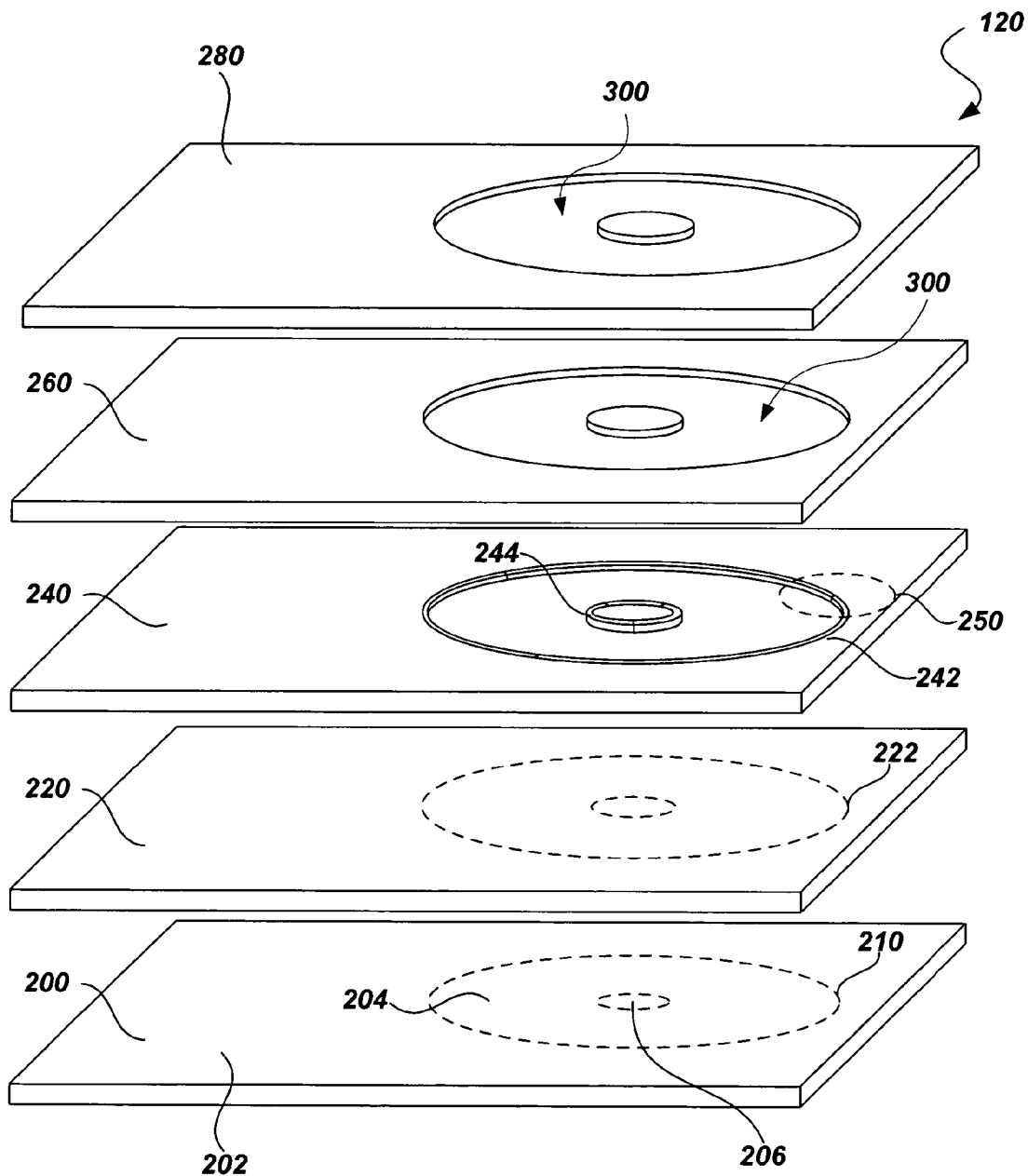
FIG. 3 is an exploded perspective view of the components of a substrate labeling system, according to one exemplary embodiment.

As mentioned, the base layer of the present exemplary label system (120) includes a film (200). As illustrated in FIG. 3, the film (200) includes a sheet of polymer having surface characteristics that may vary from glossy to matte. According to one exemplary embodiment, the film (200) may be formed by an extrusion method. When extruded, the film (200) receives a light texture transferred from the extruding roll, while the top layer forms a smooth clear surface (202). According to this exemplary embodiment, the slightly textured side may have any number of finishes formed thereon including, but in no way limited to, brushed, velvet, velvet gloss, satin, and the like.

According to one exemplary embodiment, the film (200) may include any number of polymeric films that are visually transparent in at least one region within the visible spectral region and typically is transparent throughout the visible spectral region. According to one exemplary embodiment, the polymeric film is substantially clear or semi-opaque or transparent to view a printed image there through.

Specifically, according to one exemplary embodiment, the film (200) component of the present label system (120) is formed of any transparent film that can be manufactured with different surface characteristics on opposing sides including, but in no way limited to, polycarbonate based films, polyester based films, polypropylene based films, cellulose acetate based films, and the like. A number of commercially available polycarbonate films may be used including, but in no way limited to, polycarbonate film 8A35 commercially available by GE or BE 1-4D commercially available by Bayer. According to one exemplary embodiment, the transparent layer is made of polycarbonate to match the coefficient of thermal expansion of an optical disc or other desired substrate to withstand the thermal variation associated with use and storage of the labeled media. Polycarbonate film has a high modulus and is resistant to curling when removed from the masking layer, thereby greatly improving the ease of attachment to a desired substrate.

According to one exemplary embodiment, the film may also include components which strongly absorb ultraviolet radiation thereby reducing damage to underlying images by ambient ultraviolet light, e.g., such as 2-hydroxybenzophenones; oxalanilides; aryl esters and the like; hindered amine light stabilizers, such as bis(2,2,6,6-tetramethyl-4-piperidinyl) sebacate and the like; and combinations thereof. The web or sheet may also be surface treated or coated with a material to enhance desired surface characteristics, e.g. sub-coatings, electric discharge treatment, scratch resistance, and the like. Additionally, the extruded film (200) may go through any number of post formation treatments including, but in no way limited to, an embossing treatment wherein Braille or other raised features are formed on the extruded film. According to one exemplary embodiment, Braille and other raised features exhibit strong resistance to deformation during both use and storage.

Further, as illustrated in FIG. 3, the exemplary film (200) may include a label portion (204) defined by a die cut (210) in the shape of the desired substrate, and a center member (206). According to this exemplary embodiment, the formation of a label portion (204) defined by die cuts (210, 222) and a center member (206) aid in the removal and application of a formed label to a desired substrate. The die cuts (210, 222) forming the shape of the desired substrate are configured to facilitate easy removal of a portion of the film (200) with its outer-most perimeter slightly smaller than the outer-most perimeter of a desired substrate such as an optical disc. Additionally, an inner diameter matching the optical disc inner diameter may also be cut to provide alignment registration between the label system (120) and the optical disc (110).

Continuing with FIG. 3, the present exemplary label system (120) structure includes a printable emulsion (220) or other surface formed on at least one surface of the film (200). According to one exemplary embodiment, the ink receptive emulsion (220) may be a hydrophilic, aqueous ink sorptive, coating material. Further, the ink receptive emulsion (220) may be visually transparent in at least one region within the visible spectral region and typically is transparent throughout the entire visible spectral region. According to one exemplary embodiment, the ink receptive emulsion (220) may range from fully transparent to fully opaque, depending on the intent of the label. Opacity helps to conceal the underlying substrate, while transparency enables the substrate to become part of the printed image. Further, the opacity of the ink receptive emulsion (220) may change once printed on. The visible spectral region of the ink receptive emulsion (220) may also be matched to that of the film (200).

The ink receptive emulsion (220) may be prepared from a wide variety of hydrophilic, aqueous ink sorptive, coating materials. More specifically, the ink receptive emulsion (220) typically is comprised of at least one hydrophilic polymer or resin which also may be water soluble. Suitable hydrophilic polymers or resins include, but are in no way limited to, polyvinyl alcohols, including substituted polyvinyl alcohols; polyvinyl pyrrolidones, including substituted polyvinyl pyrrolidones; vinyl pyrrolidone/vinyl acetate copolymer; vinyl acetate/acrylic copolymers; acrylic acid polymers and copolymers; acrylamide polymers and copolymers; cellulosic polymers and copolymers; styrene copolymers of allyl alcohol, acrylic acid, malaeic acid, esters or anhydride, and the like; alkylene oxide polymers and copolymers; gelatins and modified gelatins; polysaccharides; and the like. Preferred hydrophilic polymers include polyvinyl pyrrolidone; substituted polyvinyl pyrrolidone; polyvinyl alcohol; substituted polyvinyl alcohol; vinyl pyrrolidone/vinyl acetate copolymer; vinyl acetate/acrylic copolymer; polyacrylic acid; polyacrylamides; hydroxyethylcellulose; carboxyethylcellulose; gelatin; and polysaccharides. The ink receptive emulsion (220) may also contain other water insoluble or hydrophobic polymers or resins to impart a suitable degree of hydrophilicity and/or other desirable physical and chemical characteristics.

Suitable polymers or resins of this class include polymers and copolymers of styrene, acrylics, urethanes, and the like. Preferred polymers and resins of this type include a styrenated acrylic copolymer; styrene/alkyl alcohol copolymer; nitrocellulose; carboxylated resin; polyester resin; polyurethane resin; polyketone resin; polyvinyl butyral resin; or mixtures thereof. In addition to the polymeric or resin components, the ink receptive emulsion (220) typically contains other added components such as a dye mordant, a surfactant, particulate materials, a colorant, an ultraviolet absorbing material, an organic acid, an optical brightener, and the like. Dye mordants which may be used to fix the printed ink to the ink receptive emulsion (220) may be any conventional dye mordant such as polymeric quaternary ammonium salts, polyvinyl pyrrolidone, and the like. Surfactants which are used as coating aids for the ink receptive emulsion (220) may be any nonionic, anionic, or cationic surfactant. Particularly useful are fluorosurfactants, alkylphenoxypolyglycidols, and the like.

The ink receptive layer may also contain particulate material. Such materials are believed to aid in enhancing the smoothness characteristics of the ink receptive emulsion, particularly after it has been printed upon without adversely affecting the transparent characteristics of the element. Suitable particulate material includes inorganic particles such as silicas, chalk, calcium carbonate, magnesium carbonate, kaolin, calcined clay, pyrophylite, bentonite, zeolite, talc, synthetic aluminum and calcium silicates, diatomatious earth, anhydrous silicic acid powder, aluminum hydroxide, barite, barium sulfate, gypsum, calcium sulfate, and the like; and organic particles such as polymeric beads including beads of polymethylmethacrylate, copoly(methylmethacrylate/divinylbenzene), polystyrene, copoly(vinyltoluene/t-butylstyrene/methacrylic acid), polyethylene, and the like. The composition and particle size of the particles are selected so as not to impair the transparent nature of the ink receptive emulsion (220) when applied.

The ink receptive emulsion (220) may also contain a colorant, e.g., a dye or pigment, provided the emulsion is visually transparent in at least one region within the visible spectral region and typically is transparent throughout the visible spectral region. This emulsion may contain components which strongly absorb ultraviolet radiation thereby reducing damage to underlying images by ambient ultraviolet light, e.g., such as 2-hydroxybenzophenones; oxalanilides; aryl esters and the like; hindered amine light stabilizers, such as bis(2,2,6,6-tetramethyl-4-piperidinyl)sebacate and the like; and combinations thereof. Organic acids which are used to adjust the pH and hydrophilicity in the ink receptive emulsion (220) typically are non-volatile organic acids such as a alkoxy acetic acid, a glycolic acid, a dibasic carboxylic acid and half esters thereof, a tribasic carboxylic acid and partial esters thereof, aromatic sulfonic acids, and mixtures thereof. Preferred organic acids include glycolic acid, methoxy acetic acid, citric acid, malonic acid, tartaric acid, malic acid, maleic acid, fumaric acid, itaconic acid, succinic acid, oxalic acid, 5-sulfo-salicylic acid, p-toluenesulphonic acid, and mixtures thereof. Optical brighteners which may be used to enhance the visual appearance of the imaged layer may be any conventional, compatible optical brightener, e.g., such as optical brighteners marketed by Ciba-Geigy under the trademark of TINOPAL®.

As mentioned previously, the present exemplary ink receptive emulsion (220) is configured to be applied to a back side of a film to allow for the formation of a desired image. According to one exemplary embodiment, the present ink receptive emulsion (220) is configured to pull or wick any ink applied to the coating formed by the emulsion to the emulsion/film interface to maximize image quality formed by the ink.

Continuing with the exemplary structure of FIG. 3, an adhesive layer (240) is formed on the printable emulsion (220) to allow for coupling of the label portion (204) to a desired substrate. According to one exemplary embodiment, a barrier layer is deposited on top of the ink receptive emulsion (220) to prevent the adhesive layer (240) from being absorbed by the ink receptive emulsion. According to one exemplary embodiment, the adhesive is configured to permanently adhere the present label system (120) to a desired substrate after formation. The adhesive material may be chosen from a variety of conventional adhesive materials, e.g., such as pressure sensitive or contact adhesives and the like. According to one exemplary embodiment, the adhesive material may be a pressure activated adhesive material such as polyurethanes; polycaprolactone; acrylic copolymers; and combinations thereof.

Figure 4:
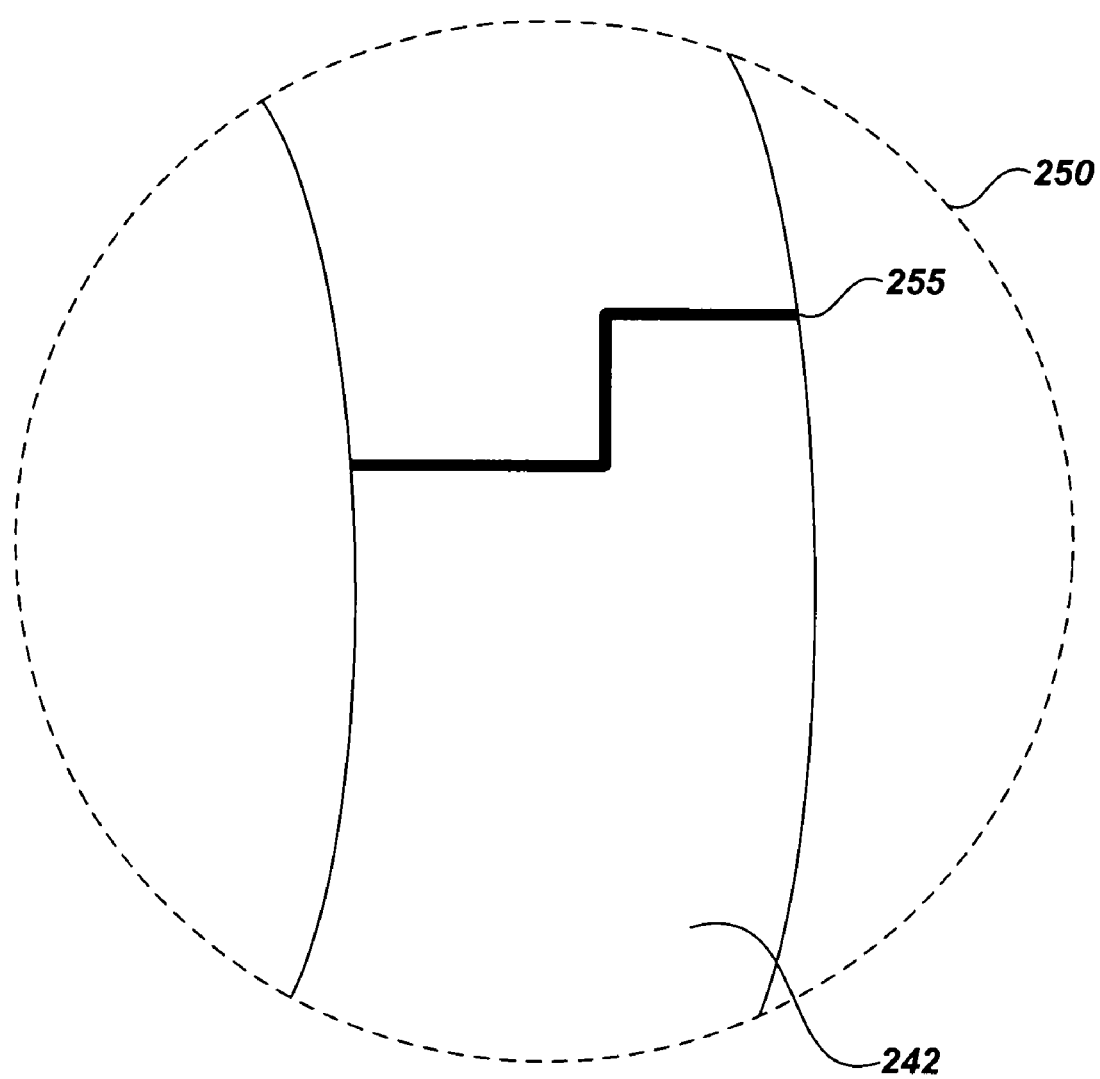
FIG. 4 is a magnified view of an adhesive vent, according to one exemplary embodiment.

According to one exemplary embodiment illustrated in FIG. 3, the adhesive layer (240) may include a plurality of annular rings of adhesive in the form of an inner annular adhesive ring (244) and an outer annular adhesive ring (242). According to one exemplary embodiment, the use of thin adhesive borders, such as the inner adhesive ring (244) and the outer adhesive ring (242) for optical disc or other such labels, maximizes the printable region of the label while providing sufficient adhesion to permanently retain the label to a desired substrate after assembly. This formation also reduces the likelihood that air bubbles will be trapped between a desired substrate and the present label system (120) during an attachment process. Reduction in the likelihood of air bubbles being trapped between a desired substrate and the present label system (120) reduces the risk that the present label will delaminate from the desired substrate and will help prevent the drive from becoming unbalanced during use. Additionally, as illustrated in FIGS. 3 and 4, one or more small vents (255) may be formed in the inner and/or outer adhesive rings (244, 242; FIG. 3) to allow for barometric pressure equilibrium and to allow moisture from the ink under the label to escape. As illustrated by the exploded vent view (250) of FIG. 4, the exemplary vents (255) may include a passage formed in the inner or outer adhesive ring (244, 242), substantially free of adhesive. According to this exemplary embodiment, the lack of adhesive in the vent allows for a channel configured to allow for the release of air and/or moisture during and after an attachment process.

Returning to FIG. 3, the adhesive layer (240) may be disposed between the printable ink receiving emulsion layer (220) and a release liner that acts as a mask over the adhesive, non-printable regions. According to one exemplary embodiment illustrated in FIG. 3, the release liner includes a release layer (260) disposed immediately adjacent to the adhesive layer (240), and an ink receptive layer (280). According to this exemplary embodiment, the release liner includes an orifice (300) formed in both the release layer (260) and the ink receptive layer (280) to allow for printable access of the printable emulsion layer (220) formed on the film (200). However, as illustrated in FIG. 2, the release liner is sufficiently large to cover or otherwise mask the adhesive layer (240) from the disposal of ink. According to one exemplary embodiment, the release layer (260) includes any number of materials configured to mask the adhesive layer (240) while providing easy removal of the film (200) and adhesive (240) including, but in no way limited to, silicone from General Electric or Dow Corning, UV-cured silicone from Rhone-Poulenc or Quillon release polymer from DuPont. Further, according to one exemplary embodiment, the ink receptive layer (280) may be formed of any number of printable backing materials including, but in no way limited to, papers, plastics, and the like. Ink receptive layer (280) is made ink receptive to enable printing an image larger than the orifice (300), thereby reducing the need for the ink dispensing system to have sufficiently high precision to print only within the orifice area. Exemplary methods of forming and applying the above-mentioned label system (120) will be described in detail below.

Exemplary Label Formation Method

Figure 5:
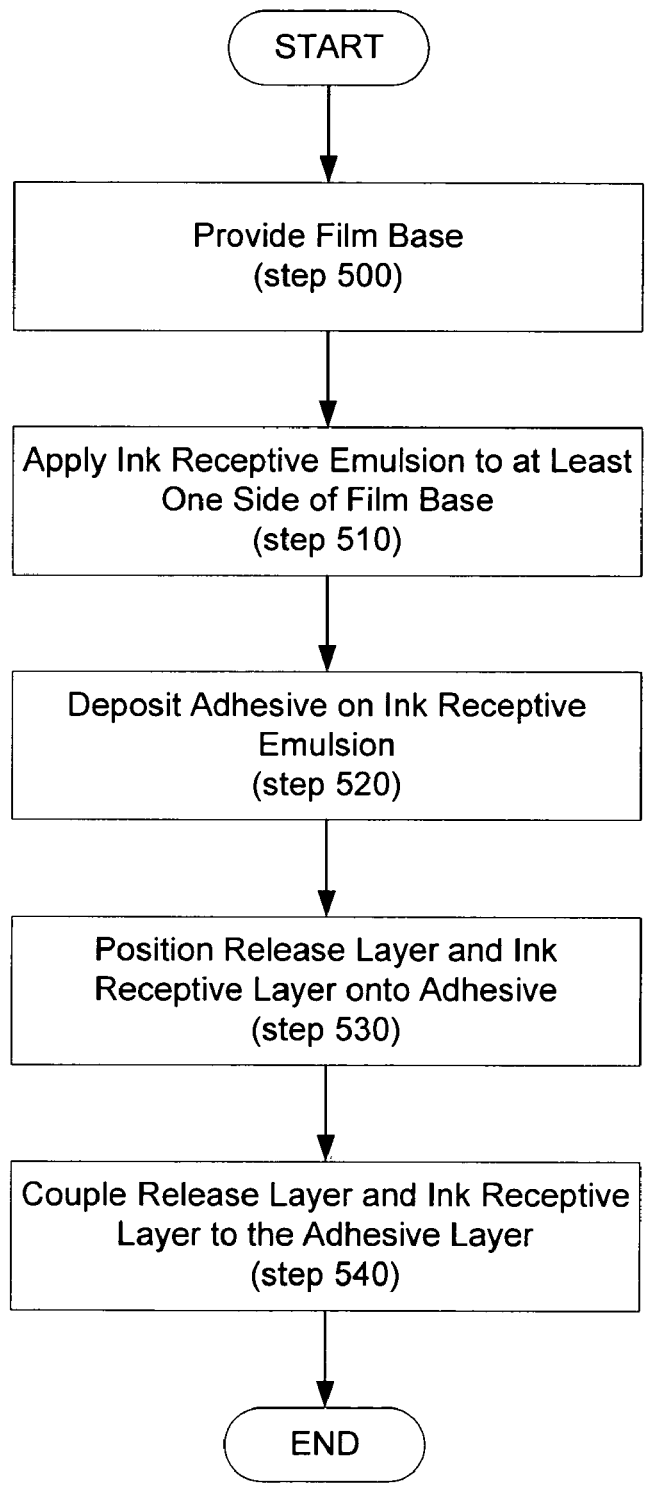
FIG. 5 is a flowchart illustrating a method for forming the present label system, according to one exemplary embodiment.

FIG. 5 is a flowchart illustrating a method of forming the present label system, according to one exemplary embodiment. As illustrated in FIG. 5, the present label may be formed by first providing a film base (step 500). As mentioned previously, the film base is preferably a polycarbonate based film, but may be any number of polymeric films that are visually transparent in at least one region within the visible spectral region.

Figure 13:
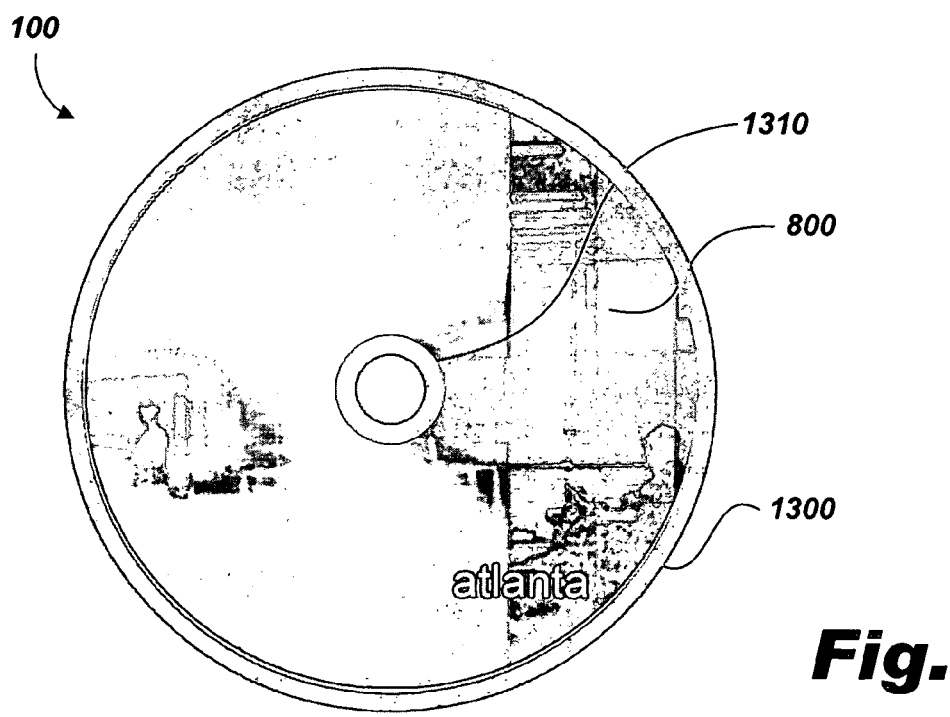
FIG. 13 is a frontal view of a labeled substrate in a disc case, according to one exemplary embodiment.

Once the desired film base is provided (step 500), the above-mentioned ink receptive emulsion may be applied to at least one side of the desired film base (step 510). According to one exemplary embodiment, the above-mentioned ink receptive emulsion may be dispensed on the desired film base using any number of dispensing methods including, but in no way limited to, doctor blade coating, curtain coating, flexographic printing, gravure coating, reverse roll coating, metering rod coating, slot or extrusion coating, immersion coating, air knife coating, and the like. According to one exemplary embodiment, a region of the printable emulsion or the base film may be pre-printed to hide any subsequently deposited adhesive, thereby improving the attractiveness of the finished label. These printed borders can be made with multiple colors and may contain product identification or marketing infatuation (e.g. +HP). The borders can also be made non-circular to create different visual effects on the top of the disc. An example would be a scalloped inner perimeter. An exemplary printed border is illustrated in FIG. 13 as an inner border (1310) and an outer border (1300).

Returning to FIG. 5, with the desired film base coated on at least one side with the ink receptive emulsion (step 510), a selective coverage adhesive may be applied to the emulsion (step 520) to aid in the transparent label being coupled to a desired substrate. Similar to the deposition of the ink receptive emulsion, the selective coverage adhesive my be deposited onto the emulsion by any number of deposition means including, but in no way limited to, ink jetting, silkscreen printing, flexographic printing, gravure coating, reverse roll coating, and the like. Further, the exemplary vents (255; FIG. 4) may be formed in the deposited adhesive layer (240) by a pre-deposition mask, a post deposition cut, selective ink jetting, and the like.

A barrier layer (230) may be deposited on top of the ink receptive emulsion to prevent the adhesive from being absorbed into the ink receptive emulsion. Following the deposition of the adhesive to the emulsion or barrier (step 520), the release layer and ink receptive layer may be positionally disposed on the adhesive (step 530) to form the present label system. According to one exemplary embodiment, the release layer and the ink receptive layer may be joined with the adhesive layer with the aid of rollers and the like. More specifically, the ink receptive layer (280; FIG. 3) and the release layer (260; FIG. 3) may be retrieved from a single roll. The orifices (300; FIG. 3) of the ink receptive layer (280; FIG.

3) and the release layer (260; FIG. 3) may then be lined up with the film layer (200; FIG. 3) such that the edges of the ink receptive layer (280; FIG. 3) and the release layer (260; FIG. 3) are lined up with the label portion (204; FIG. 3) and mask the inner ring (244; FIG. 3) and outer ring (242; FIG. 3) of the adhesive layer (240; FIG. 3). Once correctly aligned, pressure may be applied to removably couple the release layer (260; FIG. 3) and the ink receptive layer (280; FIG. 3) to the adhesive layer (240; FIG. 3) (step 540). The selective coverage adhesive may be covered by a selective (pre-cut) release liner as defined above or, alternatively, the selective coverage adhesive may be covered with a full release liner which is subsequently die cut to remove part of the release liner and expose the orifices (300; FIG. 3) of the ink receptive layer (280; FIG. 3).

Figure 6:
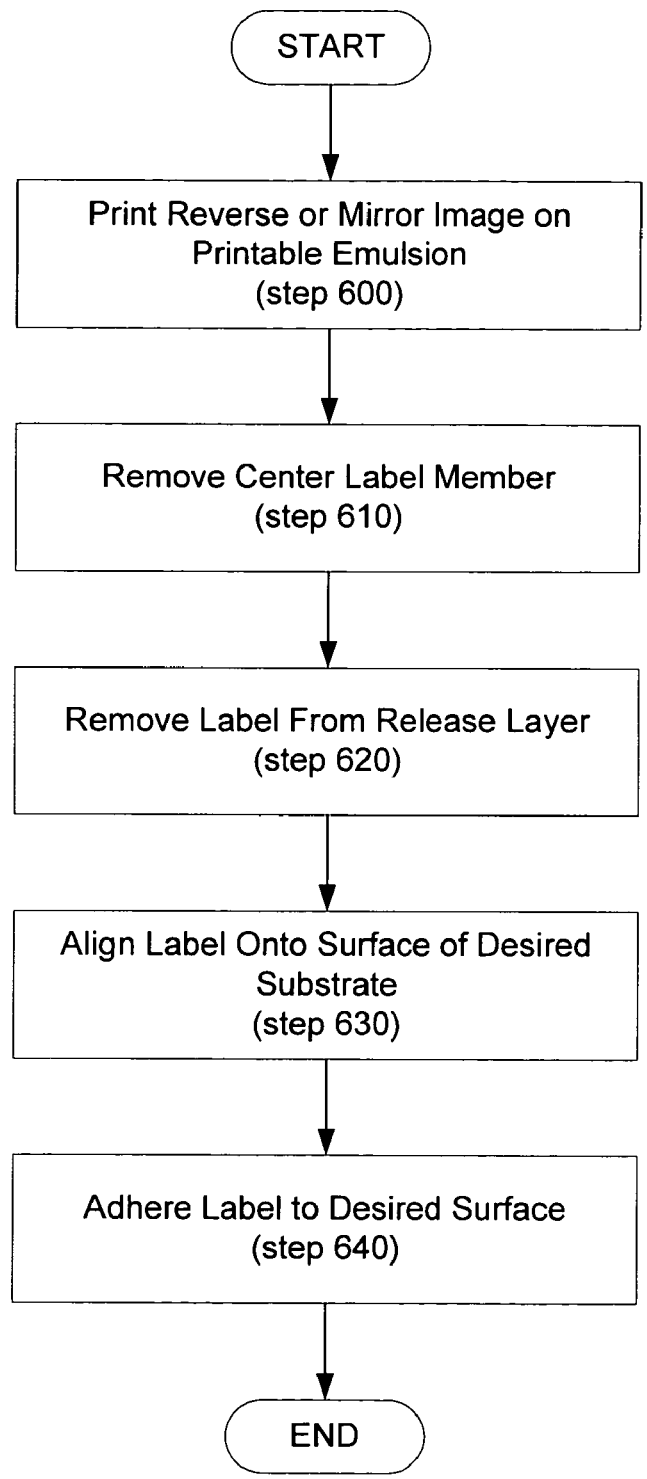
FIG. 6 is a flowchart illustrating a method for printing and applying a label to a desired substrate, according to one exemplary embodiment.
Figure 7:
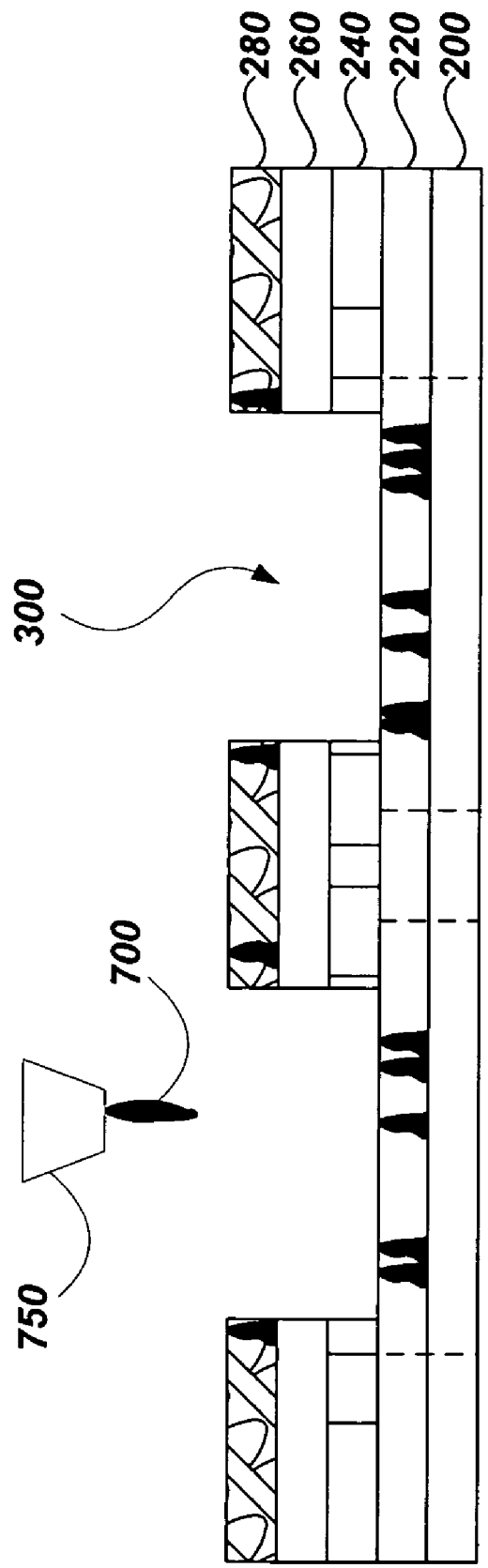
FIG. 7 is a side cross-sectional view of an image being formed on a label system, according to one exemplary embodiment.
Figure 8:
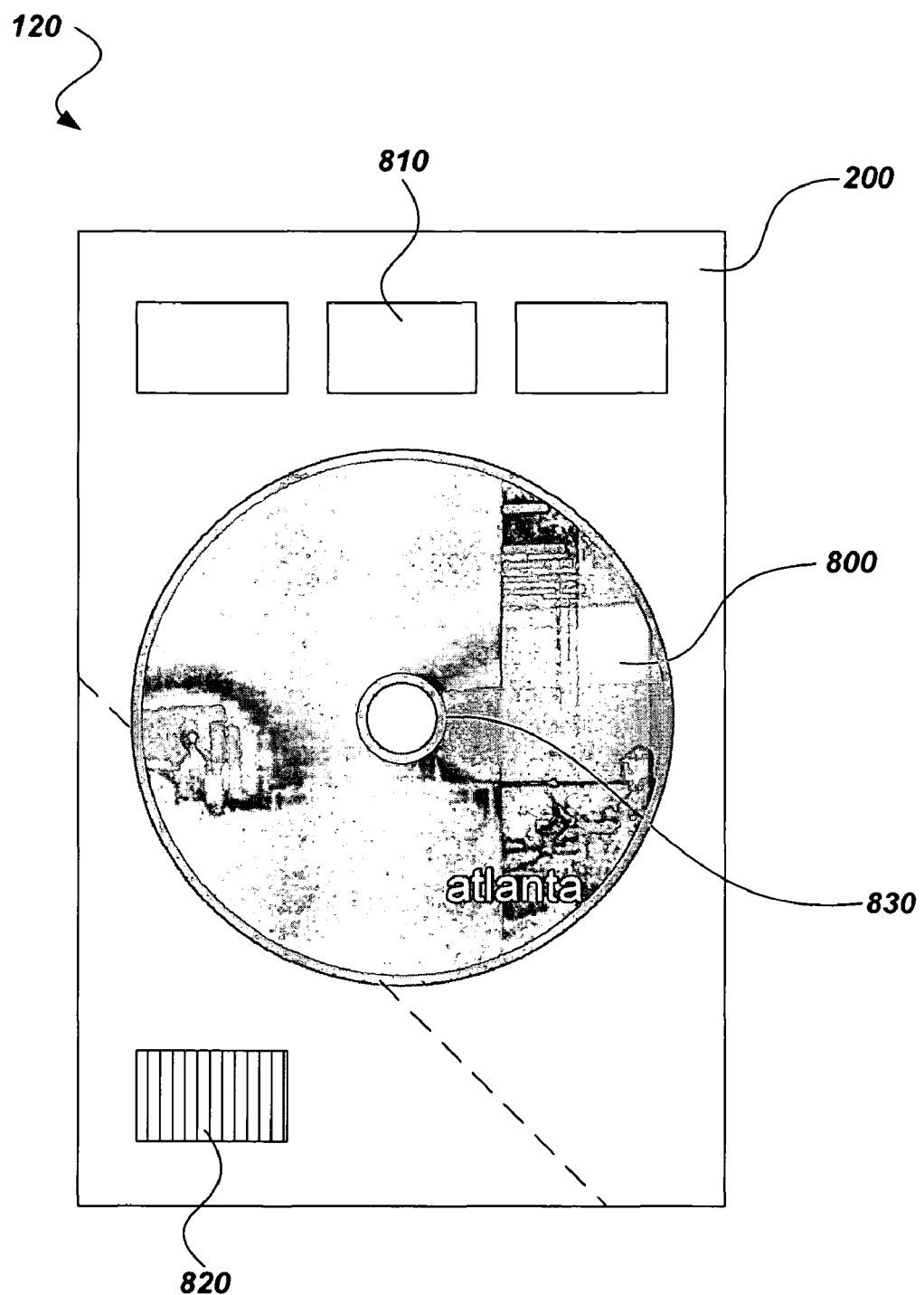
FIG. 8 is a frontal view illustrating a printed label system, according to one exemplary embodiment.

Once the present label system is formed, a desired image may be formed thereon and the label may be applied to a desired substrate. FIG. 6 illustrates an exemplary method for printing an applying the label to a desired substrate, according to one exemplary embodiment. As illustrated in FIG. 6, the present exemplary printing and adhering method includes first printing a desired image on the printable emulsion of the present label system (step 600). Once the image is printed, the center label member (830; FIG. 8) may be removed from the label system (step 610) followed by removing the label from the masking release layer (step 620). With the newly printed label removed from the masking release layer (step 620), the label may be selectively aligned to the surface of a desired substrate (step 630) and adhered to that substrate (step 640). Further details of the exemplary image formation and label adhering method will be provided below with reference to FIGS. 7 through 13.

As mentioned, the present exemplary method begins by first printing a desired image on the printable emulsion layer of the present exemplary label system (step 600). FIG. 7 illustrates the formation of a desired image. As illustrated, the present exemplary label system is presented to an inkjet material dispenser (750) with the orifice (300) immediately adjacent to the material dispenser. This provides a pathway for fluid communication between the inkjet material dispenser (750) and the printable emulsion layer (220) of the exemplary label system. According to this exemplary embodiment, the label may be positioned adjacent to the imaging device by any number of substrate transport mechanisms including, but in no way limited to, belts and/or rollers.

As illustrated in FIG. 7, an inkjet material dispenser (750) may controllably dispense droplets of ink (700) onto the ink receiving emulsion layer (220) and ink receptive layer (280). Selective deposition of the ink droplets (700) allows a user, among other things, to selectively register an image on the label, and use the imaged object for a variety of purposes such as object identification. According to the present exemplary embodiment, the desired image includes a reversed image, sometimes referred to as a mirror printing that will be inverted from the desired display.

According to one exemplary embodiment, the inkjet material dispenser (750) used to selectively dispense droplets of ink (700) onto the ink receiving emulsion layer (220) may include, but is in no way limited to, a mechanically actuated ink-jet dispenser, an electrostatically actuated ink-jet dispenser, a magnetically actuated dispenser, a piezoelectrically actuated dispenser, or a continuous ink-jet dispenser. Alternatively, ink may be applied to the ink reception layer using any number of ink deposition methods including, but in no way limited to, lithographic printing methods.

FIG. 8 illustrates a printed label (800) forming a part of a label system (120), according to one exemplary embodiment. As illustrated in FIG. 8, the printed label (800) is formed on the label system and viewed from the film layer (200). As shown, the film layer may also include a number of pre-printed instructions and/or instructional icons (810) to communicate a desired label creation and attachment process. Additionally, the film layer (200) of the label system may include other desired graphics such as bar coding (820) to provide printers with barcode reading capability the ability to automatically detect a loading of the label system in a printer.

As illustrated in FIG. 8, the printed label (800) configured to be attached to an optical disc includes an ink receptive center label member (830). According to one exemplary embodiment, the center label member (830) corresponds to a center loading orifice of an optical disc.

Figure 9:
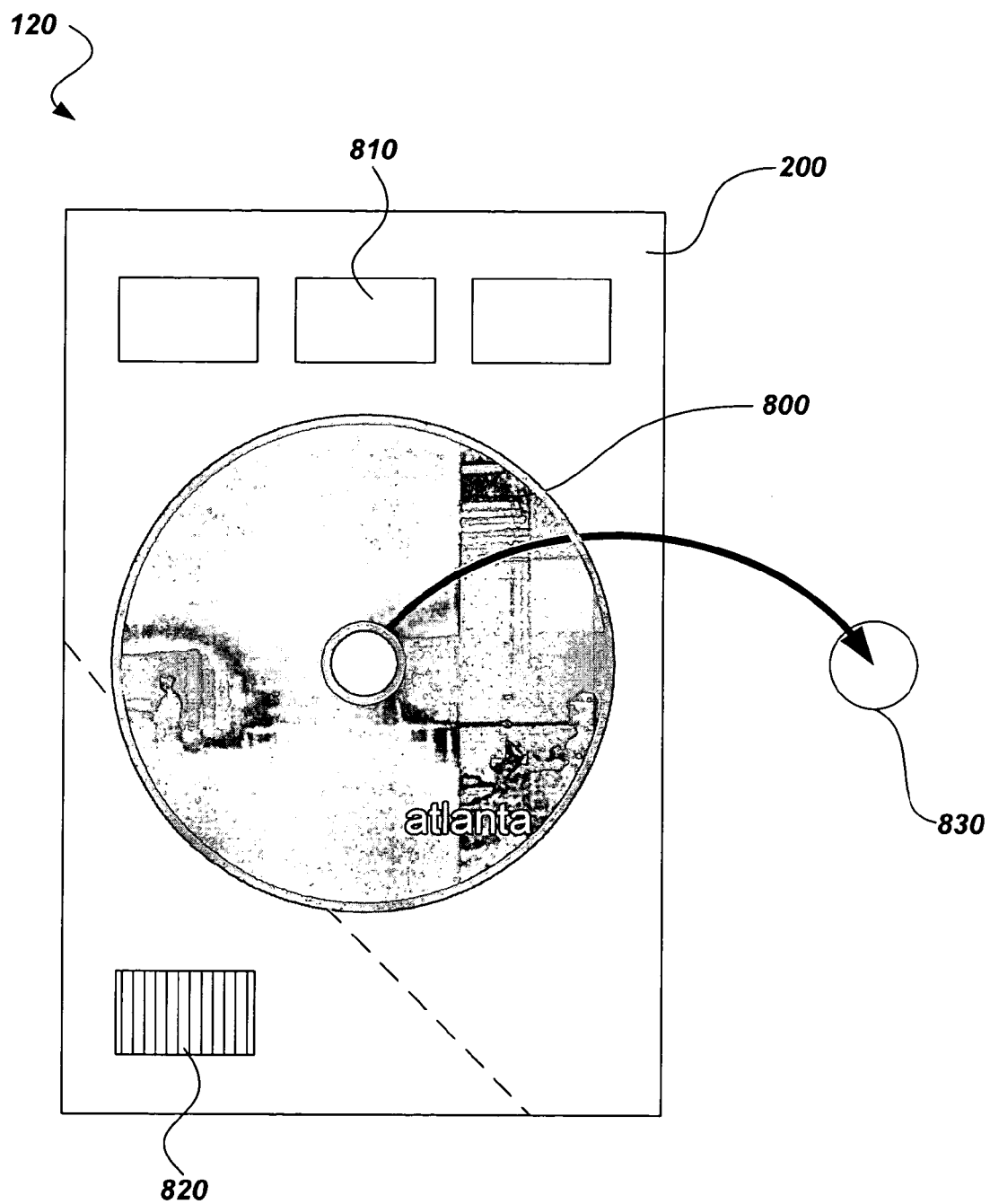
FIG. 9 is a frontal view illustrating the removal of a formed label from a release layer, according to one exemplary embodiment.

Once the desired image is formed, the label may be prepared for application to a desired substrate by removing a center label member (step 610). As illustrated in FIG. 9, the center label member (830) corresponding to a center loading orifice of an optical disc may be manually removed after printing of the desired image.

Figure 10:
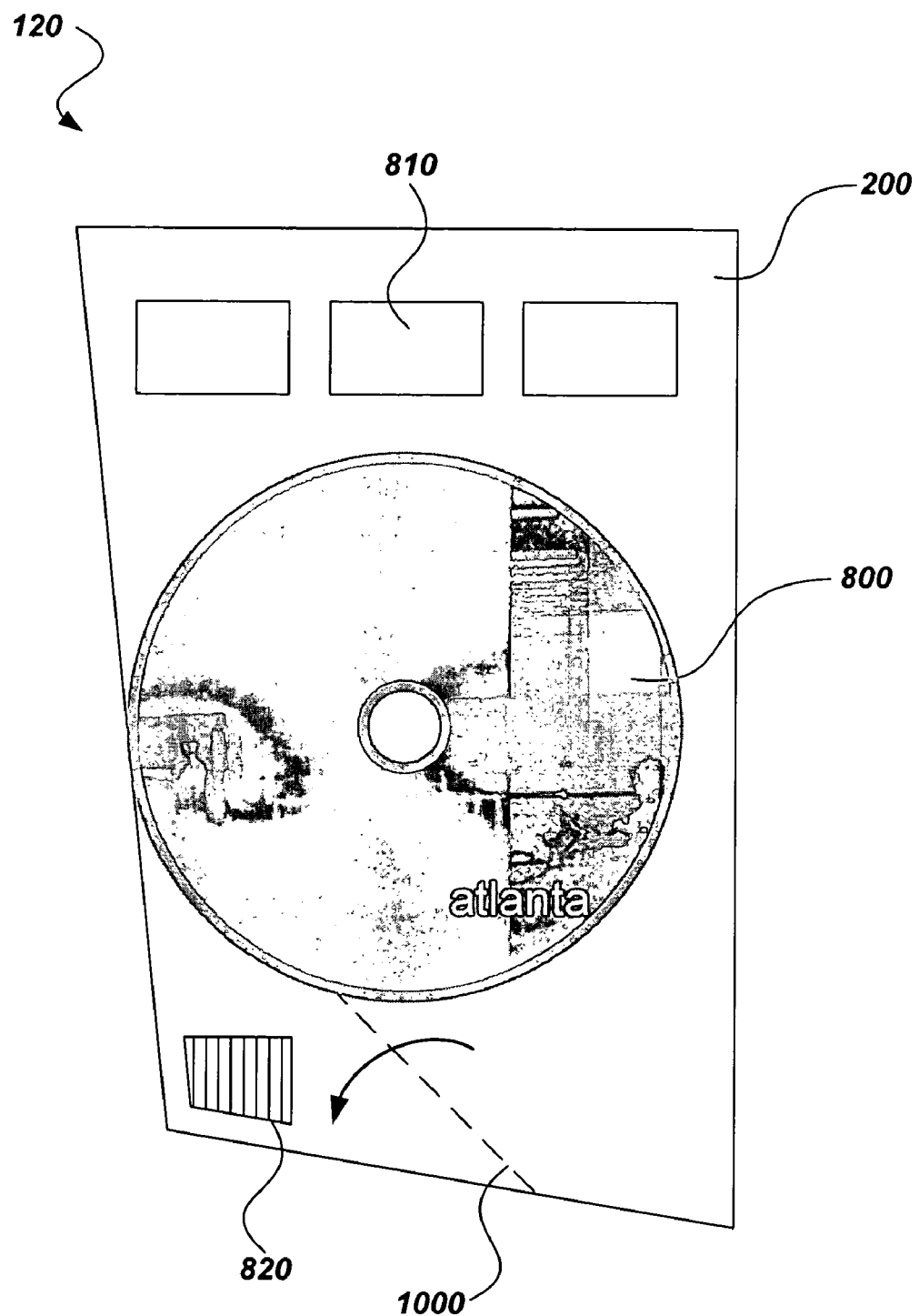
FIG. 10 is a frontal view illustrating the removal of a formed label from a release layer, according to one exemplary embodiment.

With the center label member (830) removed, the desired label may be removed from the masking release layer (step 620). As illustrated in FIG. 10, the printed label (800) may be removed from the masking release layer (step 620), according to one exemplary embodiment, by bending the film layer (200) to form a crease (1000). Bending the film layer to form a crease should cause the adhesive behind the printed label (800) portion of the film layer (200) to separate and allow the label to be manually removed from the masking release layer.

Figure 11:
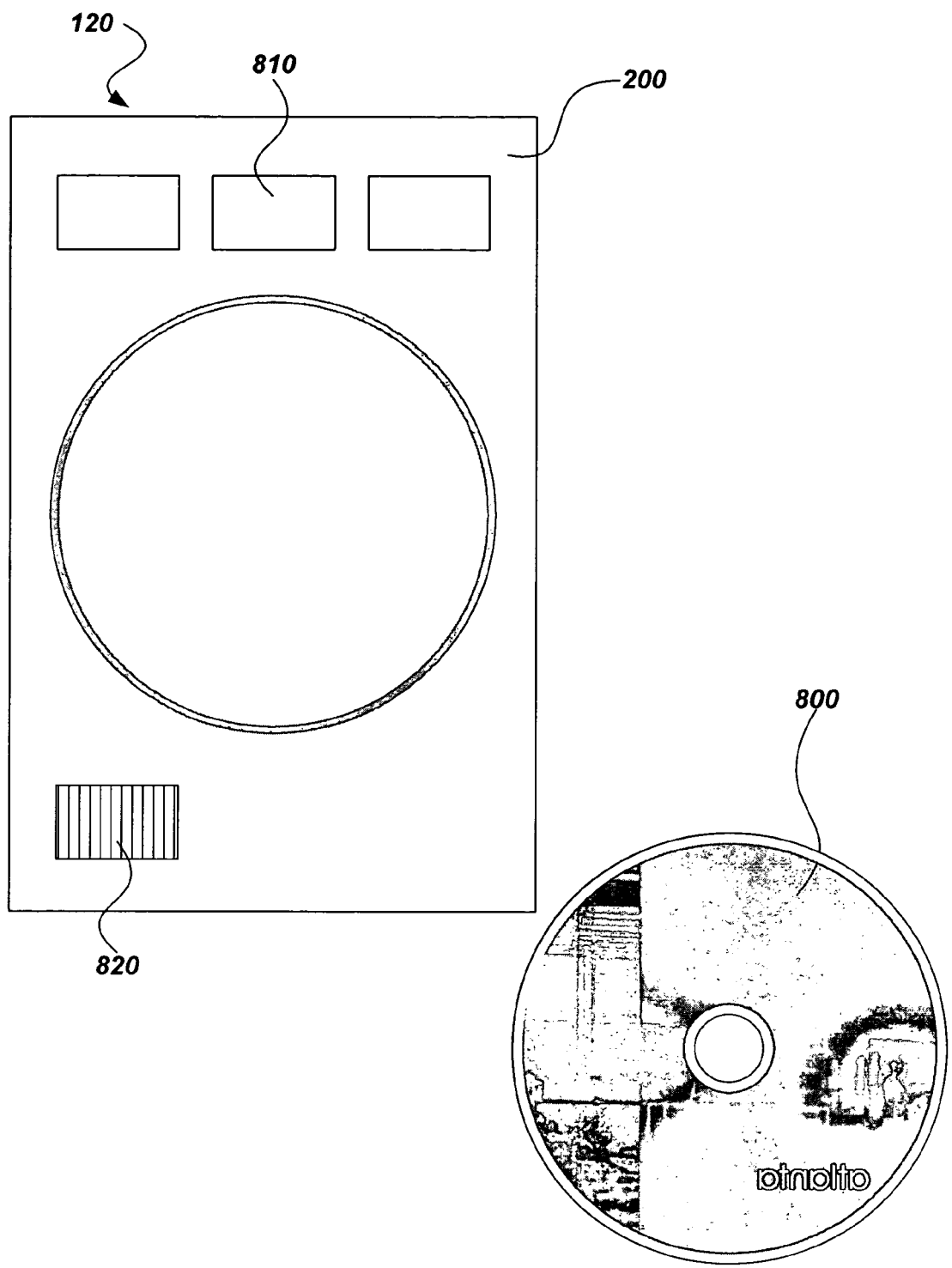
FIG. 11 is a frontal view of a release layer and a flipped side of a printed substrate with adhesive rings exposed on the facing surface, according to one exemplary embodiment.
Figure 12:
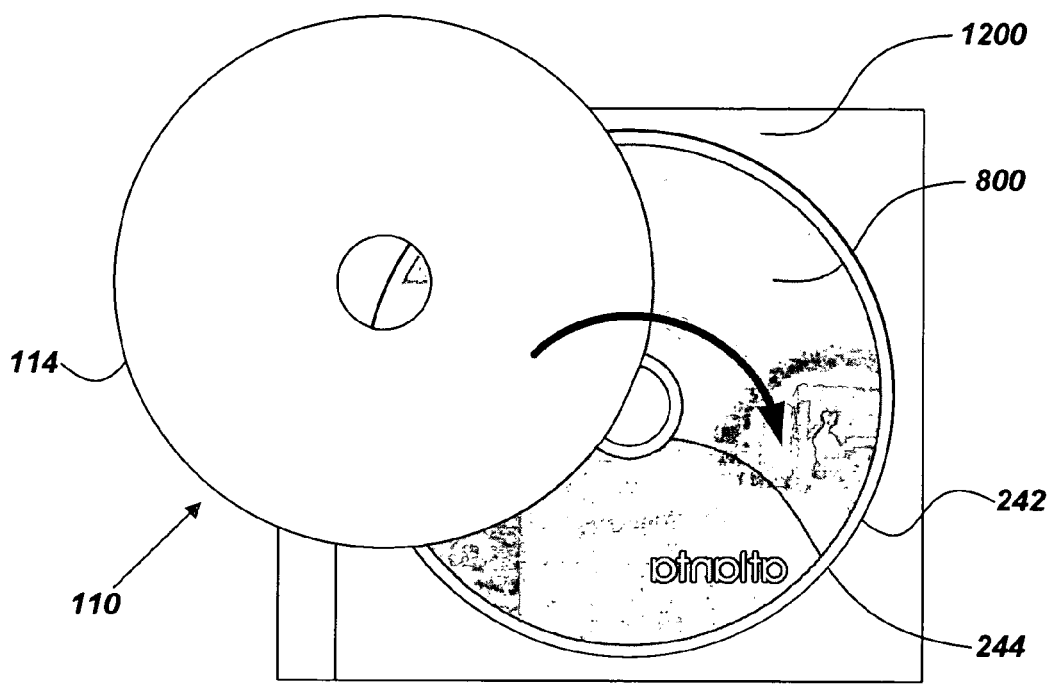
FIG. 12 is a perspective view illustrating the placement of a label on a desired substrate, according to one exemplary embodiment.

With the printed label portion removed from the masking release layer and the rest of the label system, as illustrated in FIG. 11, the printed label (800) may be aligned onto a surface of a desired substrate (step 630), according to any number of exemplary methods. FIG. 12 illustrates one exemplary method for aligning a printed label (800) onto a desired substrate such as an optical disc (110), according to one exemplary embodiment. As illustrated in FIG. 12, once the label is printed and removed from the masking layer, the jewel case (1200) of the optical disc (110) may be used to align the label onto the disc surface. According to this exemplary embodiment, a user can set the label adhesive/printed side of the printed label (800) up in the jewel case (1200) and set the optical disc (110) with the top surface (112; FIG. 1) down on top of the printed label (800).

With the optical disc (110) positioned above the printed label (800), the label may be adhered to the desired surface (step 640), such as an optical disc, via the application of pressure around the adhesive border region of the printed label (800). According to one exemplary embodiment, once pressure is applied around the adhesive border region, the printed label (800) is bonded to the top of the optical disc (110). As mentioned previously, the formation of the vents (255; FIG. 4) in the annular adhesive rings facilitates the evacuation of air and/or moisture from between the optical disc (110) and the printed label (800) once joined. With the printed label (800) coupled to the optical disc (110), the assembly can be removed from the case and reinserted label side up, as illustrated in FIG. 13. Alternatively, the printed label (800) may be applied according to a top-down orientation onto the optical disc (110) if a fixture or other guide is used.

Once the printed transparent label (800) is bonded to the top of the optical disc (110), the printed image is encapsulated between the label substrate and the disc, thereby protecting the printed image from most forms of damage, such as smearing, fading, scratching, and water. Consequently, any Braille or other raised features embossed in the printed transparent label (800) may be instantly read or touched without damaging the underlying printed image. Additionally, as mentioned previously, the data layer of the optical disc (110) is protected by the printed transparent label (800). This configuration enables instant distribution of the labeled disc since it is not necessary to wait for the ink to dry. This is particularly beneficial in commercial environments when labeled optical disc media should be printed, applied, and distributed in a short period of time.

The present label system can be formed in any number of sizes to be accepted by an inkjet printer. Specifically, according to one exemplary embodiment, the present label system may be sized to support one or more labels per sheet, thereby adding versatility to the present system. Alternatively, the present exemplary label system may be formed on a substantially continuous media, allowing for substantially continuous label production.

In conclusion, the present exemplary label system incorporates an ink receiving layer to receive a desired mirror image bordered by a plurality of annular adhesive rings having vents formed therein. By forming the plurality of annular adhesive rings on the borders of the ink receiving layer, attachment of the label to a desired substrate is simple and robust, while avoiding trapping air bubbles between the label and the desired substrate.

The preceding description has been presented only to illustrate and describe the present method and apparatus. It is not intended to be exhaustive or to limit the disclosure to any precise form disclosed. Many modifications and variations are possible in light of the above teaching. It is intended that the scope of the disclosure be defined by the following claims.

What is claimed is:

1. A system for selectively forming a label comprising:
a film;
a hydrophilic ink receptive coating coated on at least one side of said film;
an adhesive track formed on a periphery of said hydrophilic ink receptive coating;
a masking release member coupled to said adhesive track, wherein said masking release member is configured to provide access to said ink receptive coating for image formation; and
an additional ink receptive coating disposed on said release member;
wherein said adhesive track further comprises at least one vent formed in said adhesive track;
said vent being configured to permit air or moisture to escape from under said film.

2. A label comprising:
a film;
a hydrophilic ink receptive coating coated on at least one side of said film;
an adhesive track formed on a periphery of said hydrophilic ink receptive coating, said adhesive track including at least one vent formed in said adhesive track, said at least one vent comprising a vent passage formed in said adhesive track, said at least one vent being configured to permit air or moisture to escape from under said film; and
a masking release member coupled to said adhesive track, wherein said masking release member is configured to provide access to said ink receptive emulsion for image formation.

3. The label of claim 2, further comprising a reversed ink image disposed in said hydrophilic ink receptive coating.

4. The label of claim 2, wherein said film comprises one of a polycarbonate based film, a polypropylene based film, a cellulose acetate based film, or a polyester based film.

5. The label of claim 2, wherein said adhesive track further comprises a plurality of annular adhesive rings forming an inner adhesive track and an outer periphery adhesive track.

6. The label of claim 5, wherein said plurality of annular adhesive rings further comprise at least one vent formed in each of said annular adhesive rings; in which said vent passage comprises one or more turns throughout a length of said vent passage.

* * * * *